(12) United States Patent
Kim et al.

(10) Patent No.: US 9,059,859 B2
(45) Date of Patent: Jun. 16, 2015

(54) METHODS AND APPARATUS FOR REMOTE CONTROL SERVICE IN A NETWORK

(75) Inventors: Jun-Hyung Kim, Suwon-si (KR); Ho-Yeon Park, Seoul (KR); Ji-Eun Keum, Suwon-si (KR); Sung-Oh Hwang, Yongin-si (KR); Hyung-Jin Seo, Hwasung-si (KR); Bo-Sun Jung, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 409 days.

(21) Appl. No.: 12/553,565

(22) Filed: Sep. 3, 2009

(65) Prior Publication Data

US 2011/0055715 A1  Mar. 3, 2011

(51) Int. Cl.
*G06F 3/01* (2006.01)
*H04L 12/12* (2006.01)

(52) U.S. Cl.
CPC *H04L 12/12* (2013.01); *Y02B 60/34* (2013.01)

(58) Field of Classification Search
None
See application file for complete search history.

(56) References Cited

U.S. PATENT DOCUMENTS

| | | | |
|---|---|---|---|
| 7,170,422 B2 * | 1/2007 | Nelson et al. | 340/12.28 |
| 7,489,924 B2 * | 2/2009 | Choi | 455/420 |
| 7,746,245 B2 * | 6/2010 | Park et al. | 340/12.3 |
| 8,417,804 B2 * | 4/2013 | White | 709/221 |
| 2004/0150546 A1 * | 8/2004 | Choi | 341/176 |
| 2006/0031550 A1 * | 2/2006 | Janik et al. | 709/231 |
| 2007/0089055 A1 | 4/2007 | Ko et al. | |
| 2007/0174297 A1 | 7/2007 | Kim | |
| 2007/0260635 A1 * | 11/2007 | Ramer et al. | 707/104.1 |
| 2008/0098433 A1 * | 4/2008 | Hardacker et al. | 725/52 |
| 2008/0301732 A1 * | 12/2008 | Archer et al. | 725/40 |
| 2009/0187618 A1 | 7/2009 | Maeng et al. | |
| 2009/0216621 A1 * | 8/2009 | Anderson et al. | 705/10 |
| 2009/0282098 A1 * | 11/2009 | Karaoguz et al. | 709/203 |
| 2010/0071021 A1 * | 3/2010 | Friedman | 725/133 |
| 2010/0271252 A1 * | 10/2010 | Musschebroeck et al. | 341/176 |

FOREIGN PATENT DOCUMENTS

| | | |
|---|---|---|
| KR | 1020090079396 | 7/2009 |
| WO | WO 2008/013379 | 1/2008 |

* cited by examiner

*Primary Examiner* — Kakali Chaki
*Assistant Examiner* — Walter Hanchak
(74) *Attorney, Agent, or Firm* — The Farrell Law Firm, P.C.

(57) ABSTRACT

A system and methods for providing a Control User Interface (CUI) for controlling a Networked Device (ND) with a Remote Controller (RC) are provided. A Service Provider (SP) receives capability information of the RC and CUI information from the ND, generates a reconfigured CUI based on a location of the RC from which to control the ND, and transmits the reconfigured CUI to the ND. The ND receives the reconfigured CUI from the SP and transmits the reconfigured CUI to the RC. The RC receives the reconfigured CUI from the ND and controls the ND with the reconfigured CUI.

26 Claims, 8 Drawing Sheets

FIG. 5

```
<?xml version="1.0" encoding="ISO-8859-1"?>
<xs:schema xmlns="urn:schemas-ce-org:ce-html-server-caps-1-0"
xmlns:xs="http://www.w3.org/2001/XMLSchema" targetNamespace="urn:schemas-ce-org:ce-html-server-caps-1-0" elementFormDefault="qualified" attributeFormDefault="unqualified">
<xs:include schemaLocation="http://schemas.ce.org/ce-html-profiles-1-0.xsd"/> <!-- include schema of Annex C. The schemaLocation that is provided here is for informational purposes only. The schema may not be present at this URL. For validating the XML content, one should use a local copy instead. -->
<xs:element name="relatedData" type="relatedType"/>
<xs:complexType name="relatedType">
    <xs:sequence>
        <xs:element name="keyword" type="xs:string" minOccurs="0" maxOccurs="unbounded"/>
        <!-- Note: each of the following <profilelist>-elements corresponds to an <uri>-element of the parent's <protocol>-element inside an XML UI Listing, in the same order of appearance -->
        <xs:element ref="profilelist" minOccurs="1" maxOccurs="unbounded"/>
        <xs:element name="saveStateStorageURL" type="xs:anyURI" minOccurs="0" maxOccurs="1"/>
        <xs:element name="saveStatesInfo" type="savedStatesInfoType" minOccurs="0" maxOccurs="1"/>
    </xs:sequence>
</xs:complexType>
<xs:complexType name="savedStatesInfoType">
    <xs:attribute name="saveTime" type="xs:string"/>
    <xs:attribute name="forUser" type="xs:string" use="optional"/>
</xs:complexType>
<xs:complexType name="CUI outdoor service Type">
    <xs:attribute name="CUIUploadURL" type="xs:anyURI" minOccurs="0" maxOccurs="1"/>
    <xs:attribute name="CUIOutdoorServiceReqURL" type="xs:anyURI" minOccurs="0" maxOccurs="1"/>
</xs:complexType>
</xs:schema>
```

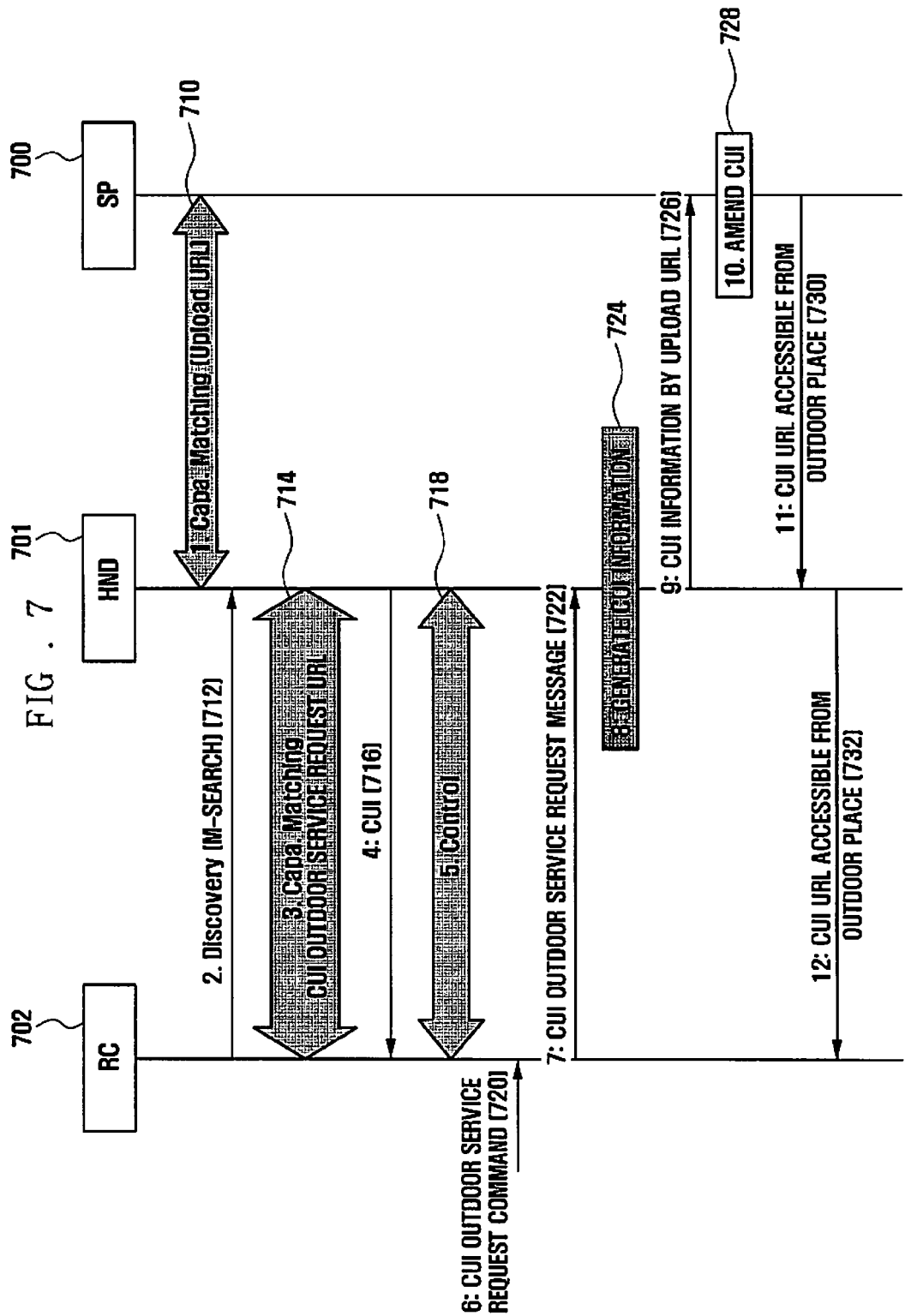

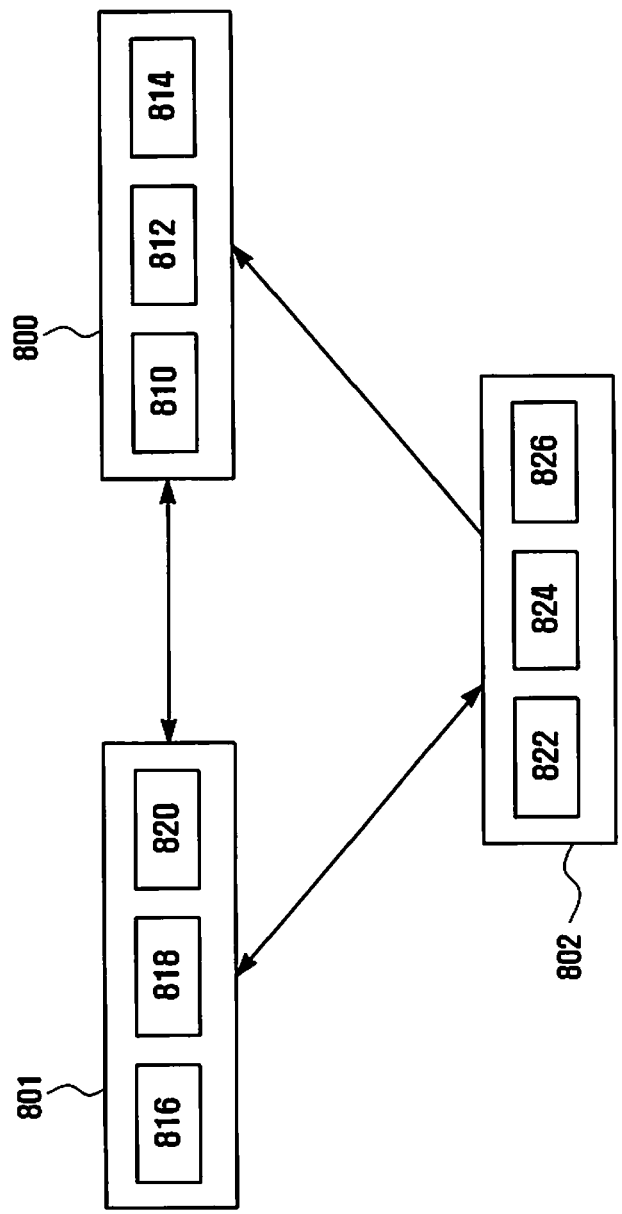

METHODS AND APPARATUS FOR REMOTE CONTROL SERVICE IN A NETWORK

BACKGROUND OF THE INVENTION

1. Field of the Invention

The present invention relates generally to the field of remote control systems and devices, and more particularly, to methods and apparatuses for providing a User Interface (UI) in accordance with an environment or condition of a Remote Controller (RC).

2. Description of the Related Art

Various organizations, such as Digital Living Network Alliance (DLNA), Home Audio-Video Interoperability (HAVI), and Universal Plug and Play (UPnP), have made developments in technology areas relating to interoperable devices and services in a home networking field.

One developing technology area in the home networking field is Remote UI (RUI), which allows one device to control the functions of another device in a home network. RUI is based on a client-server architecture in which an RUI Client (RUIC) is provided with a UI and is served by an RUI Server (RUIS). The UI allows a user to remotely control the RUIC through the RC.

FIG. 1 is a diagram illustrating operations of a conventional home network, having an RUIC 101, an RUIS 100, and an RC 102. The RUIS 100 first provides the RUIC 101 with its RUI. Functions of the RUIC 101, rendered by the RUI, are mapped to keys of the RC 102. This mapping allows the RC 102 to send control information to the RUIC 101 to control the RUIC 101.

As mobility has recently become more important to users, a new RUI device, or RC, such as a portable or mobile device, has been developed with an enhanced UI display. The control interface of the new RC is customizable, and is capable of providing device-specific control information or user-specific supplementary information for different RCs. Specifically, the new RC can be configured to provide information related to control of a current RUI rendered in the RUIC 101, or to provide user-specific information, such as personalized control information. The new RC is also capable of accommodating control information uniquely provided by the manufacturers of the RUIS 100 and the RUIC 101.

FIG. 2 is a diagram illustrating remote control service of a home network when an RC moves from an indoor space to an outdoor space. An RUIS, or Service Provider (SP) 200, provides content and content-specific CUIs for controlling the content and operations of an RUIC, or a Home Network Device (HND). The home network may include multiple HNDs, such as a television (TV) 201. The home network of FIG. 2 also includes a home Gateway (GW) 203 for receiving service programs and/or commands from the SP 200 via a backbone network. The home GW 203 delivers the CUIs to the TV 201. The TV 201 sends the CUIs to an RC 202. The RC 202 controls the TV 201 and the content playing on the TV 201 with the CUIs.

When a user carries the RC 202 to an outdoor space, the RC 202 is able to maintain its connection to the home network using a Virtual Private Network (VPN). The VPN provides a virtual tunnel connection between the RC 202 and the home network. Controlling the TV 201 from the outdoor space is likely to be inconvenient due to the fact that a screen of the TV 201 is not visible to the user. Specifically, the user is unable to check an operation status of the TV 201 from the outdoor space when using the RC 202 to control the TV 201. Further, due to the mobile characteristics of the RC 202, the RC 202 is required to process and maintain the VPN connection in the outdoor space, which is not cost-effective.

SUMMARY OF THE INVENTION

The present invention has been made to address at least the above problems and/or disadvantages and to provide at least the advantages described below. Accordingly, an aspect of the present invention provides methods and apparatuses for providing a CUI for an RC in a network.

According to one aspect of the present invention, a method for providing a Control User Interface (CUI) for controlling a Networked Device (ND) with a Remote Controller (RC) is provided. A reconfigured CUI based on a location of the RC from which to control the ND is received at the ND from a Service Provider (SP). The reconfigured CUI is transmitted from the ND to the RC.

According to another aspect of the present invention, a method for providing a Control User Interface (CUI) for controlling a Networked Device (ND) with a Remote Controller (RC) is provided. A reconfigured CUI is received at the RC from the ND. The reconfigured CUI is generated by a Service Provider (SP) based on a location of the RC from which to control the ND. The ND is controlled by the RC with the reconfigured CUI.

According to an additional aspect of the present invention, a method for providing a Control User Interface (CUI) for controlling a Networked Device (ND) with a Remote Controller (RC) is provided. Capability information of the RC and CUI information are received at a Service Provider (SP) from the ND. A reconfigured CUI based on a location of the RC from which to control the ND is generated at the SP. The reconfigured CUI is transmitted from the SP to the ND.

According to a further aspect of the present invention, a Networked Device (ND) of a network is provided. The ND includes a receiver for receiving a reconfigured Control User Interface (CUI) based on a location of a Remote Controller (RC) from which to control the ND, from a Service Provider (SP). The ND also includes a transmitter for transmitting the reconfigured CUI to the RC.

According to another aspect of the present invention, a Remote Controller (RC) of a network is provided. The RC includes a receiver for receiving a reconfigured Control User Interface (CUI) from a Networked Device (ND). The reconfigured CUI is generated by a Service Provider (SP) based on a location of the RC from which to control the ND. The RC also includes a processor for controlling the ND with the reconfigured CUI.

Additionally, according to a further aspect of the present invention, a Service Provider (SP) of a network is provided. The SP includes a receiver for receiving capability information of a Remote Controller (RC) and Control User Interface (CUI) information from a Networked Device (ND). The SP also includes a processor for generating a reconfigured CUI based on a location of the RC from which to control the ND. The SP further includes a transmitter for transmitting the reconfigured CUI to the ND.

Further, according to another aspect of the present invention, a network for providing a Control User Interface (CUI) for controlling a Networked Device (ND) with a Remote Controller (RC) is provided. The network includes a Service Provider (SP) for receiving capability information of the RC and CUI information from the ND, generating a reconfigured CUI based on a location of the RC from which to control the ND, and transmitting the reconfigured CUI to the ND. The network also includes the ND for receiving the reconfigured CUI from the SP and transmitting the reconfigured CUI to the RC. The network further includes the RC for receiving the reconfigured CUI from the ND, and controlling the ND with the reconfigured CUI.

BRIEF DESCRIPTION OF THE DRAWINGS

The above and other aspects, features and advantages of the present invention will be more apparent from the following description when taken in conjunction with the accompanying drawings, in which:

FIG. 5 is an RUI server capability description schema defining functions of an RUI server, which provides an outdoor CUI for remote control service of a home network, according to an embodiment of the present invention;

FIG. 7 is a diagram illustrating operations of remote control service of a home network, according to an embodiment of the present invention; and FIG. 8 is a block diagram illustrating an SP, an HND and an RC, according to an embodiment of the present invention.

DETAILED DESCRIPTION OF EXEMPLARY EMBODIMENTS OF THE PRESENT INVENTION

Figure 1:
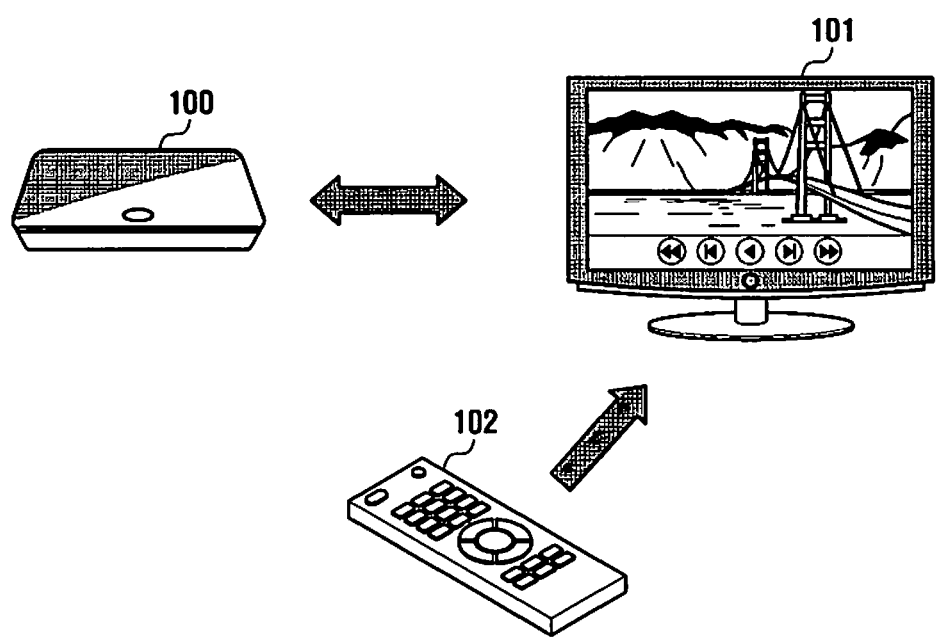
FIG. 1 is a diagram illustrating operations of a conventional home network with RUI.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Exemplary embodiments of the present invention provide a user with a CUI suitable for an environment of an RC so that the user may monitor the operation status and result of a controlled HND, such as a TV, thereby reducing degradation of service quality and increasing convenience. Embodiments of the present invention no longer require a VPN connection between the RC and a home network, thereby reducing maintenance costs.

Figure 2:
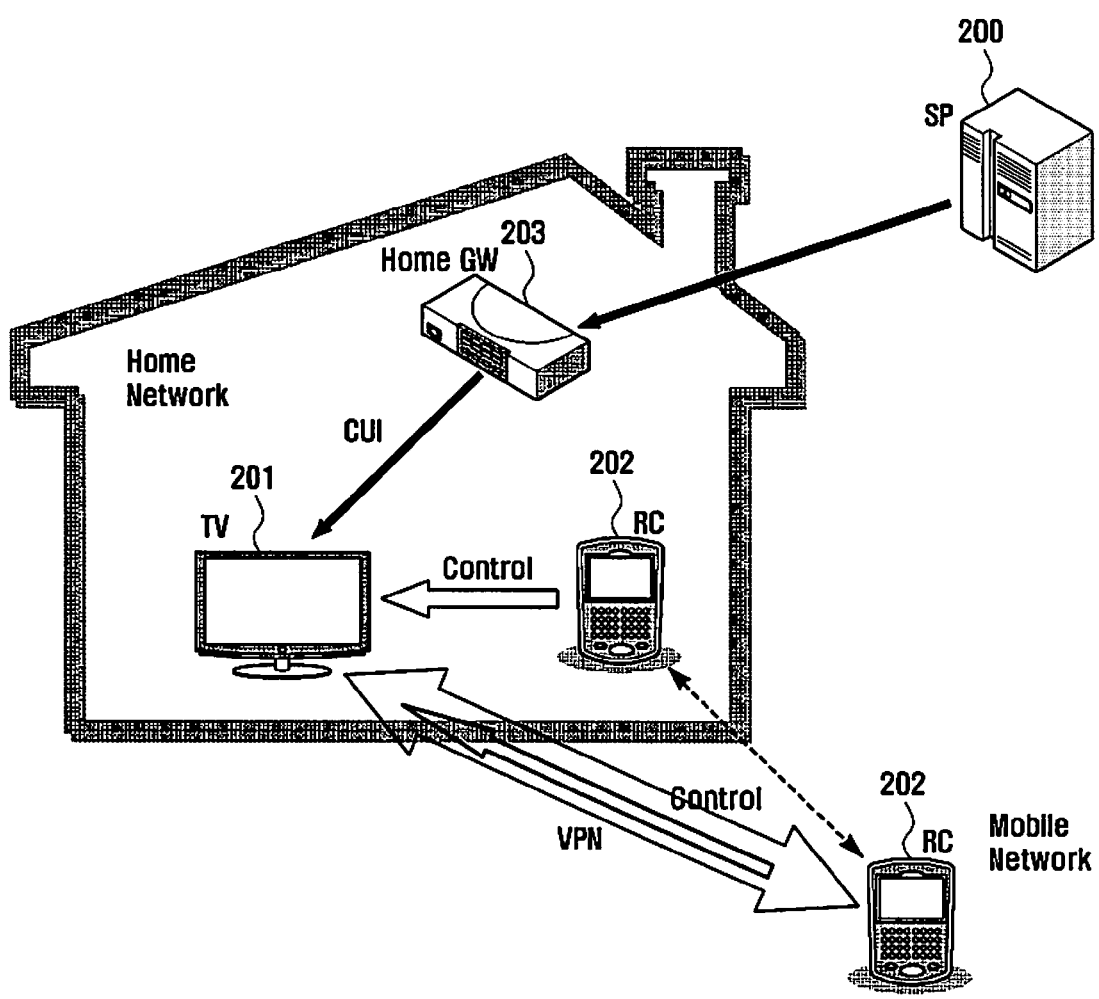
FIG. 2 is a diagram illustrating remote control service of a home network when an RC moves from an indoor space to an outdoor space.
Figure 3:
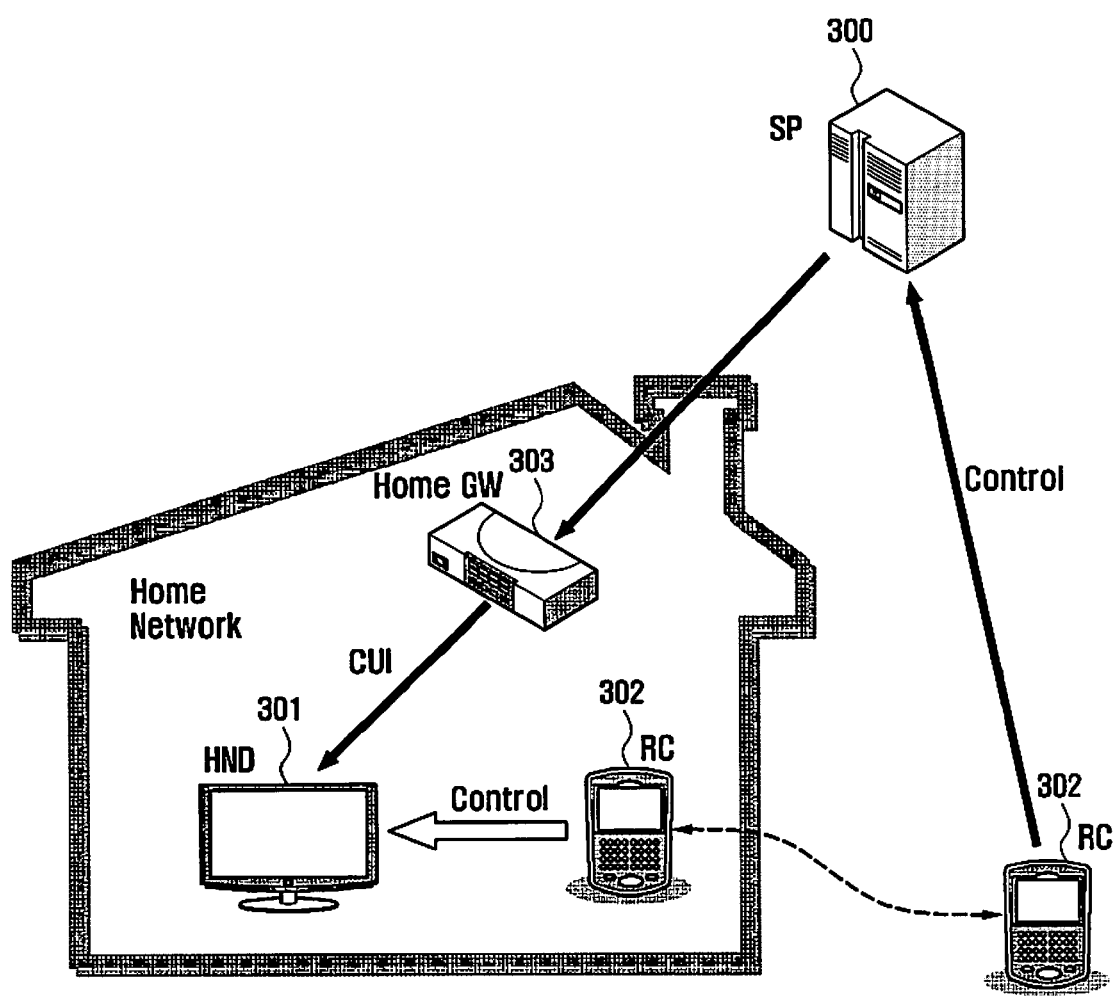
FIG. 3 is a diagram illustrating remote control service of a home network when an RC moves from an indoor space to an outdoor space, according to an embodiment of the present invention.

Referring to FIG. 3, a diagram illustrates a remote control service of a home network when an RC moves from an indoor space to an outdoor space, according to an embodiment of the present invention. The connectivity between an SP 300, a home GW 303, an HND 301, such as a TV, and an RC 302 is similar to that shown and described with reference to FIG. 2, when the RC 302 is in the indoor space. When the RC 302 is in the outdoor space, the RC 302 provides a user with a new CUI, previously received by the HND 301, which allows the user to check an operation status of the HND 301 and an execution result of a control command without directly viewing a screen of the HND 301. When utilizing the new CUI on the RC 302, control commands from the RC 302 are sent over a cellular or wireless network, and relayed, via the SP 300, to the home gateway 303 and the HND 301.

Figure 4:
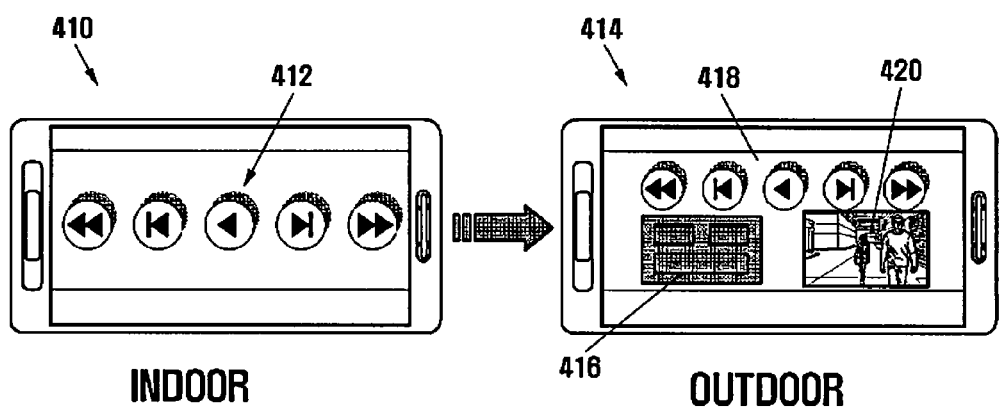
FIG. 4 is a diagram illustrating indoor and outdoor CUIs on an RC, according to an embodiment of the present invention.

FIG. 4 is a diagram illustrating an indoor CUI 410 and an outdoor CUI 414 for an RC, according to an exemplary embodiment of the present invention. The indoor CUI 410 is displayed when the RC is connected to the home network, or specifically, when the RC is in the indoor space. Due to the fact that the status of an HND, such as a screen of the TV, is visible to the user in the indoor space, the RC provides the indoor CUI 410 having only simplified control buttons 412 on its display. The outdoor CUI 414 has a first window 416 for displaying the operation status of the HND, such as a TV, or a result of control commands. The first window 416 is provided in addition to control buttons 418 because the user of the RC is unable to directly view the HND, such a TV screen, from the outdoor space. The RC may also be configured to display different CUIs according to its location, so that location-specific information or services 420, such as advertisement services, may also be provided on the RC. The location-specific information or services may be provided in the form of text, graphics, audio, video, and other forms of media without departing from the scope of the present invention.

In order for the SP to provide the RC with the outdoor CUI, the TV first transmits information required for composing the outdoor CUI to the SP. Further, in an embodiment of the present invention, access information is required for the RC to access the outdoor CUI provided by the SP.

Referring now to FIG. 5, an RUI server capability description schema is provided, according to an embodiment of the present invention. The schema defines functions of the RUIS, or SP, which provides the outdoor CUI for remote control service of the home network. According to an exemplary embodiment of the present invention, the schema includes a tag defining a "CUI outdoor service Type" having properties of CUIUploadURL and CUIOutdoorServiceReqURL. The CUIUploadURL is an address of the SP to which the HND, or TV, sends CUI information of the RC so that the SP may compose a new CUI. The CUIOutdoorServiceReqURL is an address of the HND to which the RC requests outdoor service.

Figure 6:
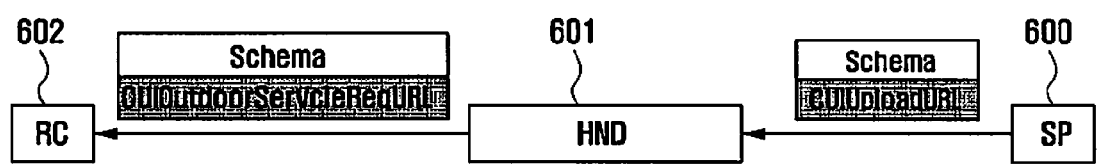
FIG. 6 is a diagram illustrating capability matching between an SP and an HND and between the HND and an RC, according to an embodiment of the present invention.

FIG. 6 is a diagram illustrating capability matching between an SP 600 and an HND 601, and between an RC 602 and the HND 601, according to an embodiment of the present invention. In the first capability matching process between the SP 600 and the HND 601, the CUIUploadURL is transmitted from the SP 600 to the HND 601. In an exemplary embodiment of the present invention, the CUIOutdoorServiceReqURL is also transmitted from the SP 600 to the HND 601 in the first capability matching process. In the second capability matching process between the HND 601 and the RC 602, the CUIOutdoorServiceReqURL is transmitted from the HND 601 to the RC 602.

Referring now to FIG. 7, a diagram illustrates operations of remote control service of a home network, according to an embodiment of the present invention. The remote control service system includes an SP 700, an HND 701, such as a TV, and an RC 702. The procedure of FIG. 7 describes how an outdoor CUI, enabling the RC 702 to control the HND 701 from an outdoor space, is created and sent to the RC 702 by the SP 700.

The methodology begins at step 710, in which the HND 701 performs a first capability matching process with the SP 700 in order to receive a service via an RUI. In the first capability matching process between the HND 701 and the SP 700, the HND 701 receives and stores a CUI through which the RC 702 can control content. Further, the SP 700 delivers an Upload URL (CUIUploadURL) and a Service Request URL (CUIOutdoorServiceReqURL) to the HND 701, via the RUI server capability description schema, as described above with respect to FIGS. 5 and 6. The Upload URL is a location of the SP 700 to which the HND 701 sends reconfigured CUI information upon request for CUI outdoor service by the RC 702, as described in greater detail below.

When the RC 702 accesses the home network after the first capability matching process between the HND 701 and the SP 700, the RC 702 multicasts a discovery message to one or more HNDs to find the HND 701 in step 712. The RC 702 is considered to access a network when, for example, the RC 702 powers on, a battery of the RC 702 is changed, or the RC 702 moves from outside the coverage of the home network to within the coverage of the home network.

When the RC 702 discovers the HND 701, the RC 702 performs a second capability matching process with the HND 701 in step 714. In the second capability matching process, the Service Request URL is transmitted from the HND 701 to the RC 702. The Service Request URL is a URL of the HND 701 to which the RC 702 can request CUI outdoor service.

In step 716, the RC 702 receives a CUI for controlling content of the HND 701, from the HND 701. The RC 702 is then capable of transmitting control commands via the CUI and receiving a response from the HND 701 in step 718.

In step 720, the RC 702 detects a CUI outdoor service request command input by a user of the RC 702. Upon detection of the CUI outdoor service request command, the RC 702 transmits a CUI outdoor service request message to the HND 701 in step 722. The CUI outdoor service request message is sent using the Service Request URL received in the second capability matching process between the RC 702 and the HND 701 in step 714.

When the HND 701 receives the CUI outdoor service request message, it reconfigures and generates CUI information in step 724. The CUI information is reconfigured with respect to a condition of the RC 702. Conditions of the RC 702 may include a screen size, speaker and microphone of the RC 702, available service information, information indicating outdoor use of the RC 702, and other information specific to the RC 702. For example, if the size of a display of the RC 702 is small, the SP 700 may configure the advertisement information in the CUI accordingly. Further, if the display of the RC 702 cannot not support moving pictures, the SP 700 may configure the CUI as having only a text based advertisement window.

In step 726, the HND 701 transmits the reconfigured CUI information to the SP 700 via the Upload URL acquired in the first capability matching process between the HND 701 and the SP 700 in step 710. Upon receipt of the reconfigured CUI information, the SP 700 composes a new CUI specific to a condition of the RC 702 in step 728, and transmits the new CUI to the HND in step 730. When the HND 701 receives the new CUI, the HND 701 forwards the new CUI to the RC 702 in the indoor space in step 732. Thus, the RC 702 acquires a corresponding CUI for outdoor use. In controlling the HND 701 from the outdoor space via the new CUI, a control command is transmitted from the RC 702, via a cellular or wireless communication network to the SP 700, and then from the SP 700 to the HND 701 via a backbone network and a home gateway.

Referring now to FIG. 8, a block diagram illustrates an SP 800, an HND 801, and an RC 802, according to an embodiment of the present invention. The SP 800 has a processor 810, a transmitter 812 and a receiver 814, for performing the steps of the SP 800 described above with respect to FIG. 7. The HND 801 has a processor 816, a transmitter 818 and a receiver 820, for performing the steps of the HND 801 described above with respect to FIG. 7. The RC 802 has a processor 822, a transmitter 824, and a receiver 826 for performing the steps of the RC 802 described above with respect to Claim 7. The processors 810, 816 and 822 perform capability matching and composing of a new CUI, while the transmitters 812, 818 and 824 and the receivers 814, 820 and 826 perform the transmitting and receiving steps, respectively.

As described in the embodiments of the present invention, the remote control service system and method provide a user with a consistent CUI regardless of the location or environment of the user and the RC. This guarantees uniform quality of experience, which improves a user's satisfaction with the service and results in an increase in probable subscriptions for the service. While the HND has been described above as a device controlled by the RC for purposes of explanation, the HND serves not only as a client, i.e., an RUIC to receive an RUI from the SP, but the HND also serves as a server, i.e., an RUIS to supply an RUI to the RC.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for providing a Control User Interface (CUI) for controlling a Networked Device (ND) with a Remote Controller (RC), comprising the steps of:
   transmitting a request for the CUI, including information corresponding to a location from where the RC controls the ND, from the ND to a Service Provider (SP);
   receiving, at the ND, the CUI corresponding to the location from where the RC controls the ND, from the SP, wherein the CUI is configured differently, at the SP, according to whether the location from where the RC controls the ND is an indoor space or an outdoor space; and
   transmitting the CUI from the ND to the RC.

2. The method of claim 1, further comprising:
   receiving CUI upload information, indicating a URL address of the SP to which the ND sends the request for the CUI (CUIUploadURL), and CUI outdoor service information, indicating a URL address of the ND to which the RE requests outdoor service (CUIOutdoorServiceReqURL) from the SP; and
   transmitting the CUI outdoor service information to the RC.

3. The method of claim 1, wherein the request further includes
   capability information of the RC, including at least one of screen size information, speaker information, and microphone information of the RC, and
   wherein the CUI is configured based on the capability information of the RC.

4. The method of claim 2, further comprising:
receiving a CUI outdoor service request from the RC based on the CUI outdoor service information; and
transmitting the request based on the CUI upload information.

5. The method of claim 1, wherein the CUI is configured based on at least one of capability information of the RC, a user subscription service, user information and service information.

6. The method of claim 1, wherein the CUI comprises a window for displaying a state or control result of the ND.

7. The method of claim 1, wherein the CUI comprises advertisement information based on the location of the RC.

8. The method of claim 1, further comprising:
receiving control information from the SP, which is generated by the CUI and transmitted from the RC.

9. A method for providing a Control User Interface (CUI) for controlling a Networked Device (ND) with a Remote Controller (RC), comprising the steps of:
transmitting a request for the CUI, including information corresponding to a location from where the RC controls the ND, from the RC to the ND;
receiving, at the RC, the CUI corresponding to the location from where the RC controls the ND, from the ND, wherein the CUI is configured differently, by a Service Provider (SP), according to whether the location from where the RC controls the ND is an indoor space or an outdoor space; and
controlling the ND using the CUI at the RC.

10. The method of claim 9, further comprising:
transmitting capability information of the RC, including at least one of screen size information, speaker information, and microphone information of the RC, to the ND, wherein the CUI is configured based on the capability information.

11. The method of claim 9, further comprising:
transmitting a CUI outdoor service request to the ND based on CUI outdoor service information, indicating a URL address of the ND to which the RE requests outdoor service (CUIOutdoorServiceReqURL).

12. The method of claim 11, further comprising:
receiving the CUI outdoor service information from the ND.

13. The method of claim 9, wherein the CUI is generated based on at least one of capability information of the RC, a user subscription service, user information and service information.

14. The method of claim 9, wherein the CUI comprises a window for displaying a state or control result of the ND.

15. The method of claim 9, wherein the CUI comprises advertisement information based on the location of the RC.

16. The method of claim 9, further comprising:
transmitting, to the SP, control information generated by the CUI to control the ND.

17. A method for providing a Control User Interface (CUI) for controlling a Networked Device (ND) with a Remote Controller (RC), comprising the steps of:
receiving, at a Service Provider (SP), a request for the CUI, including information corresponding to a location from where the RC controls the ND, from the ND;
generating, at the SP, the CUI corresponding to the location from where the RC controls the ND, wherein the CUI is configured differently according to whether the location from where the RC controls the ND is an indoor space or an outdoor space; and
transmitting the CUI from the SP to the ND, for reception at the RC.

18. The method of claim 17, further comprising:
transmitting CUI upload information, indicating a URL address of the SP to which the ND sends the request for the CUI (CUIUploadURL), and CUI outdoor service information, indicating a URL address of the ND to which the RE requests outdoor service (CUIOutdoorServiceReqURL), to the ND.

19. The method of claim 17, wherein the request further includes capability information of the RC, including at least one of screen size information, speaker information, and microphone information of the RC; and
wherein the CUI is configured based on the capability information of the RC.

20. The method of claim 19, wherein the CUI is generated based on the capability information of the RC.

21. The method of claim 17, wherein the CUI comprises a window for displaying a state or control result of the ND.

22. The method of claim 17, wherein the CUI comprises advertisement information based on the location of the RC.

23. The method of claim 17, further comprising:
receiving control information generated by the CUI from the RC; and
transmitting the control information to the ND.

24. A Networked Device (ND) of a network comprising:
a transmitter for transmitting a request for a Control User Interface (CUI), including information corresponding to a location from where a Remote Controller (RC) controls the ND, to a Service Provider (SP); and
a receiver for receiving the CUI corresponding to the location from where the RC controls the ND, from the SP, wherein the CUI is configured differently, at the SP, according to whether the location from where the RC controls the ND is an indoor space or an outdoor space,
wherein the transmitter transmits the CUI to the RC.

25. A Remote Controller (RC) of a network comprising:
a transmitter for transmitting a request for a Control User Interface (CUI), including information corresponding to a location from where the RC controls a Networked Device (ND), from the RC to the ND;
a receiver for receiving the CUI corresponding to the location from where the RC controls the ND, from the ND, wherein the CUI is generated and configured differently, by a Service Provider (SP), according to whether the location from where the RC controls the ND is an indoor space or an outdoor space; and
a processor for controlling the ND using the CUI.

26. A Service Provider (SP) of a network comprising:
a receiver for receiving a request for a Control User Interface (CUI), including information corresponding to a location from where a Remote Controller (RC) controls a Networked Device (ND), from the ND;
a processor for generating the CUI corresponding to the location from where the RC controls the ND, wherein the CUI is configured differently according to whether the location from where the RC controls the ND is an indoor space or an outdoor space, at the processor; and
a transmitter for transmitting the CUI to the ND, for reception at the RC.

* * * * *